3,431,205
Patented Mar. 4, 1969

3,431,205
PROCESS FOR PRODUCTION OF METAL BEARING CARBON BLACK
Wolfgang K. F. Otto, Spartanburg, S.C., assignor to Ashland Oil & Refining Company, Houston, Tex., a corporation of Kentucky
No Drawing. Filed Sept. 17, 1965, Ser. No. 488,283
U.S. Cl. 252—62.55    8 Claims
Int. Cl. H01f 1/09; C23c 11/02

ABSTRACT OF THE DISCLOSURE

Trouble-free formation of magnetic carbon blacks, e.g. with reduced deterioration of furnace linings, is attained by decomposing a heat-decomposible compound of iron, nickel and/or cobalt in the cooling zone of a reactor in the presence of previously-formed carbon black particles.

---

This invention relates to the production of metal-bearing carbon black. More particularly, it relates to carbon blacks characterized by significant magnetic permeability.

Of the various types of carbon blacks now known to persons skilled in the art, furnace carbon blacks are the most widely used. They are useful in a wide variety of applications, especially as pigments and fillers.

Furnace carbon black is produced in highly specialized furnaces, called reactors, wherein a hydrocarbon fuel, such as oil or natural gas, is burned to produce hot combustion gases having a characteristically high temperature, e.g., about 2300° F. or higher. Into these hot combustion gases, a hydrocarbon feedstock is injected. Most commonly, the feedstock is a hydrocarbon oil and it is vaporized as it is injected into the combustion gases. The feedstock is rapidly dispersed in the combustion gases and is rapidly heated thereby to a temperature at which the feedstock thermally decomposes into carbon, hydrogen, some lower molecular weight hydrocarbons, and, under certain circumstances, small quantities of tarry materials. The resultant mixture of combustion gases and decomposition products, aptly termed smoke by persons skilled in the art, is then cooled, e.g. as by spraying a coolant, such as water, into the smoke. The carbon is then recovered from the smoke in the form of exceedingly small particles, ranging in size from about 100 to about 1000 angstroms in diameter.

The exceedingly small particle size just mentioned is one of the characterizing features of furnace carbon blacks. Other characterizing features of these particles generally include an average carbon content of about 95% by weight or higher, an ash content of up to about 1 or 1½ percent by weight and a sulfur content of up to about 1½ percent by weight. The carbon black may bear on its surface up to about 2% maximum by weight of oxygen as well as small amounts of hydrocarbon materials. The carbon to hydrogen weight ratio in carbon black is usually in the range of about 100:1 to about 1000:1. Also, furnace carbon black particles commonly tend to associate with one another, forming chain or rod-like aggregations in which adjacent particles cohere to one another with considerable force.

Carbon black has competed with varying degrees of success with various other types of pigments, but there has been one field of application which has been dominated by other pigments; that is in the production of magnetic ink, ferrographic copying pigments, magnetic rubber and plastics compositions and the like. The furnace carbon black of commerce is a non-magnetic material and therefore formulations for the above mentioned products have heretofore required other materials such as oxides and powders of metals possessing magnetic properties.

Oxides and powders of metals possessing magnetic properties have long been used for admixing and blending with waxes, plastics, synthetic and natural rubbers, lacquers, varnishes, paints, papers, inks and other formulations to impart the property of mangetism to the finished product. The prior art is replete with such usages. The magnetic oxides and powders, however, suffer from various disadvantages normally associated with inorganic pigments in general. Among these disadvantages is the great difficulty normally associated with grinding such inorganic pigments to the extremely small particle size required in the preparation of such pigments for use in printing or reproducing inks. Even when sufficiently ground, such pigments generally provide poor wettability and dispersion properties. When incorporated in ink they tend to settle out during storage and therefore can clog the equipment in which the ink is used. Further, these powders and oxides often impart very poor flow and working properties. Even after formulation and application as coatings upon conventional type non-magnetic substrates, these materials often fail to properly adhere. Furthermore, the original color of the formulation is often diluted by the additive oxides and powders and in coating upon a substrate the oxides and powders tend to agglomerate, forming streaks and smudges. Thus, there has been a demand for magnetic pigments of improved properties, especially pigments for magnetic reproducing and printing inks.

Heretofore, it has been proposed to manufacture permeable or magnetic carbon black by producing a feedstock solution by bringing together a hydrocarbon oil and an oil-soluble heat-decomposible metallo-organic compound having a metallo moiety which is at least one metal selected from the group consisting of iron, nickel and cobalt; burning a hydrocarbon fuel with oxygen-bearing gas to produce hot combustion gases having a temperature of at least about 2300° F.; injecting said feed-stock solution into said burning mixture substantially continuously for decomposing said feedstock into a mixture of decomposition products, including carbon black particles, said metallo-organic compound being present in said feedstock solution in sufficient amount to provide a weight ratio of no less than about 5 and no more than about 50 parts by weight of metal in each 100 parts by weight of said particles; and recovering the resultant metal-bearing particles of carbon black from said mixture.

The recovered material is a permeable pigment which is intensely black at relatively low, e.g. 8%, metal loadings, and somewhat less intensely black as loadings approach 50%. The particles have the property of dispersing quite readily in oily vehicles such as are used in making ink and forms stable suspensions therein. Their particle size is sufficiently small so that they require no grinding prior to use as pigments, and they are readily attracted by a magnetic field. That the material is not a mere mixture of carbon particles and discrete particles of magnetic oxides or metal is shown by the fact that substantially all of the particles in a mass of such particles are similarly attracted by a magnet. Examination of the product by water-sedimentation, X-ray diffraction and electron microscopy has failed to uncover any evidence of separate particles of metal or metal oxide. Also, substantial portions of the metal content of the product appear unextractible with mineral acid. Thus, it appears that the metal content of the product is substantially tied up within the carbonaceous particles. Whether the metal is present in the particles as free metal or as some compound has not been definitely established, but there is evidence to support the conclusion that some or all of the metal is converted to an oxide or oxides.

While the product produced by the above-described process is an excellent one, and the process can readily be performed by anyone skilled in the carbon black art, nevertheless the process has proved expensive to carry out, since the introduction into the carbon black reactor of the metal-containing compounds required in the process can shorten the life of the refractory materials constituting the furnace linings. As is well known to persons skilled in the art, carbon black reactors are lined with refractory materials in cast and/or brick form. The use of such materials is necessitated by the extremely high temperatures which prevail in such reactors. The replacement of the refractory in such a reactor is a time-consuming and expensive process. Therefore the introduction into a carbon black producing process of any factor which tends to seriously reduce the life of the refractory lining significantly increases the cost of the product and, ultimately, decreases its commercial desirability.

Although there is no desire to be bound by any theory, it appears that the breakdown of the refractory material during the above-described process is attributable to a fluxing action exerted upon the refractory by the metals of the metal-containing compounds used in forming the magnetic black. Such metals are believed to form solid solutions with the compositions of the refractories, such solid solutions having a lower melting point and therefore a faster rate of deterioration than the refractory compositions themselves. Be that as it may, it is apparent that the introduction of metallo-organic compounds of the character employed in manufacturing magnetic carbon black as above described does substantially shorten the life of furnace linings as such method is being practiced and, as a consequence, considerably increases the cost of the product. Therefore, there remains a demand for still other methods of making magnetic carbon blacks which are not subject to the above disadvantage.

It is the principal object of this invention to fulfill the above demand. A further object is to provide a novel process for the manufacture of magnetic carbon blacks. Another object of the invention is to provide a method for making magnetic carbon black wherein a solution or slurry or heat-decomposable metallic material is injected into the carbon black reactor. Still another object of the invention is to provide a novel method for making magnetic carbon black wherein the feedstock may or may not contain a decomposable metallo-organic compound. A further object of the invention is to provide a method for making magnetic carbon black in which at least partially preformed carbon black is brought into contact with a heat-decomposable metallo-organic compound or residue thereof while said carbon black is being cooled down from its temperature of reaction. These and other objects of the invention will be readily apparent to a person skilled in the art upon careful consideration of the description of the invention which follows.

In accordance with the invention, a magnetic carbon black is produced by the process comprising the steps of: dissociating a hydrocarbon feedstock in a dissociation zone at a temperature of at least about 2300° F.; passing the resultant carbon black and effluent gases to a cooling zone; in said cooling zone, cooling said carbon black and effluent gases to a temperature below about 1500° F. by spraying water into said cooling zone; said water having dispersed therein a heat-decomposable metal-containing compound containing at least one element selected from the group consisting of iron, nickel and cobalt.

The hydrocarbon feedstock utilized in the method of this invention may be any of the gases, vapors or oils commonly employed as feedstocks in the preparation of carbon black. The term "oils" includes not only those hydrocarbon substances that are liquid at ambient temperatures, but also those higher molecular weight hydrocarbons which must be heated before they become fluid.

Generally, the feedstocks are characterized by the presence of aromatic, naphthenic, and paraffinic compounds, or any combination thereof, but especially aromatics. The preferred feedstocks are the viscous, by-product oils from fluid catalytic petroleum cracking processes.

In accordance with the invention, a hydrocarbon feedstock is converted to carbon black in a furnace-type carbon black reactor, a highly specialized furnace especially adapted to produce carbon black by the furnace process. The furnace process involves intimately mixing a hydrocarbon feedstock with hot combustion gases having a temperature of at least about 2300° F. to thermally dissociate all or a portion of the feedstock to carbon black. In the furnace process and in the reactors for carrying it out, certain distinct events occur in succession. Therefore, the portions of the reactor in which these different events occur may be regarded as distinct zones from the standpoint of what happens in the process, even though the reactor may contain no structural elements for physically separating such zones from one another. Consequently, it may be said that each furnace carbon black reactor has a combustion zone in which hot combustion gases are formed through combustion of either some of the hydrocarbon feedstock or a separate fuel or both. The hydrocarbon feedstock, or that portion thereof that has not been burned to produce heat, and the resultant hot combustion gases are introduced into a dissociation zone in which the dissociation of vaporized feedstock into carbon black principally occurs. The feedstock may be introduced into the dissociation zone either in liquid, atomized or vaporized form and may be projected into the dissociation zone directly, or through the combustion zone or in any other convenient manner. Downstream of the combustion and dissociation zones is a cooling zone in which the carbon black, hot combustion gases and any other dissociation products produced in the dissociation zone are cooled to a temperature below about 1500° F. Such cooling zones are commonly provided with means for introducing an aqueous coolant, usually referred to as "quench water" into the dissociation products. The combustion gases and dissociation products, known as "smoke," give up heat and therefore diminish in temperature while heating and vaporizing the quench water. The quenched products are then discharged from the reactor into auxiliary cooling and collection equipment for separating the carbon black from the smoke. The rate of introduction of quench water into the quenching zone of the furnace is regulated to limit the temperature of the smoke to a level that is safe for the auxiliary cooling and collection equipment.

The heat decomposable metal compound employed as an additive to quench water in accordance with the present invention may be any organic or inorganic compound or complex that has an appreciable content of iron, nickel, cobalt or some combination thereof. The compound should be one that decomposes spontaneously or by chemical reaction in the presence of (1) a mixture of hot combustion gases and carbon black having a temperature of at least about 2300° F. and (2) sufficient quench water to cool said mixture to a temperature below about 1500° F. The heat decomposable metal compound should be at least water-dispersible, e.g. soluble in water or able to be formed into a pumpable, sprayable aqueous suspension with or without the aid of suspending or dispersing agents. For purposes of this disclosure and the appended claims, the terminology "water soluble" shall refer not only to those metal compounds which dissolve to an appreciable extent in water alone, but also to those metal compounds which form colloidal suspensions in water and to those which are soluble in aqueous systems containing added substances which render the compounds soluble or compatible with such systems, e.g. acids, bases and organic solvents, such as alcohol. Among the inorganic compounds which may be employed are the hydroxides of iron, nickel and cobalt and the salts of one or more of said metals with weak and strong inorganic acids. Among the organic heat-decomposable metal compounds which may be employed are those in which the molecules thereof contain one or more atoms of iron, nickel and cobalt and an organic radical or moiety. The metal atom or atoms may be bonded either to an atom of carbon or to an atom of another element in the organic portion of the molecule. For example, the compound may be a metal carbonyl or acid salt. The water-soluble organic and inorganic salts of iron, nickel and cobalt constitute the preferred class of heat-decomposable metal compounds for use in connection with the present invention. Among the organic acid salts, the salts of mono- and di-basic aliphatic acids with 1 to about 6 carbon atoms are preferred.

By way of example and not limitation, various heat-decomposable metal compounds are set forth: ferric acetate, ferric bromide, ferric carbonate, ferric chloride, ferric chloride hydrate, ferric chromate, ferric hydroxide, ferric malate, ferric nitrate, ferric phosphate, ferric sulfate, ferrous acetate, ferrous chloride, ferrous fumarate, ferrous oxalate, ferrous sulfate, iron pentacarbonyl, nickel acetate, nickel carbonate, nickel carbonyl, nickel chloride, nickel cobalt sulfate, nickel formate, nickel hydroxide, nickel nitrate, nickel sulfate, cobaltous acetate, cobaltous bromide, cobaltous carbonate, cobaltous chloride, cobaltous fluoride, cobaltous formate, cobaltous nitrate, cobaltous oxalate, cobaltous perchlorate, cobaltous succinate, cobaltous sulfamate, and cobalt tetracarbonyl. It is contemplated that any of the above-mentioned heat-decomposable metal compounds or mixtures thereof may be employed in the method of the invention. The amount of heat-decomposable metal compound that may be dispersed in the quench water is limited only by the dispersibility or the solubility of the compound in the quench water and the pumpability and sprayability of the resultant quenching fluid. Not only may relatively large amounts of compound be used, but also, the amount may be exceedingly small. Generally speaking the amount of compound should be such as to provide a metal content in the product of about 0.5 to about 50% by weight, based on the weight of the entire product, of iron, nickel, cobalt or a mixture thereof. Product having a content of less than about 5% by weight of the enumerated metals may be useful for some purposes, but the permeability and coercivity of the product are regarded as inadequate in respect to the making of magnetic ink and molding compounds. Therefore, it is preferred that the process be conducted so as to recover a product containing at least about 5% by weight of one or more of the enumerated metals. The upper limit of the preferred range of enumerated metal content is about 35% by weight.

The concentration of compound which must be present in the quench water to produce a desired percentage of metal content R in the product may be readily determined. Present experience indicates that about 30 to about 50% of the compound that has been dispersed in the quench water finds its way into the final product. Assuming that this percentage averages about 40% and that the rate of flow of quenching fluid (less metal compound) is $q$ pounds per hour, the rate of carbon black (less metal) production is $b$ pounds per hour, the concentration of metal compound in the quench water is $c$, and the proportion of the weight of the compound that is accounted for by the content of iron, nickel and cobalt therein is $m$ the relationship of these variables may be stated as follows:

(1) $$\frac{R}{100} = \frac{.40(q/b)cm}{1 + R/100}$$

(2) $$R = \frac{40(q/b)cm}{1 = R/100}$$

(3) $$\frac{R(1 + R/100)}{40(q/b)m} = C$$

Since R is the desired value it may be readily substituted in Equation 3. The values for $q$ and $b$ may readily be determined while withholding metal compound from the quench water and operating the reactor normally. The value for $m$ may be readily computed by dividing the total atomic weight of metal in the compound by the molecular weight of the compound. With the aforesaid values properly substituted therein, Equation 3 may be readily solved for $c$, the required concentration of the compound in the quench water to produce the desired weight percentage R of metal content in the carbon black product.

The preparation of magnetic carbon black in accordance with the invention may be carried out in any furnace type carbon black reactor and accompanying collection system. A wide variety of such reactors and systems are known to persons skilled in the art, and the invention may be practiced in substantially all of them. Therefore, they will not be described herein. For the purposes of practicing the invention, the reactors and collection systems may be operated in the same manner as when producing a non-magnetic carbon black product, except that the quenching fluid will be a mixture of the usual water and one or more of the aforementioned metal-containing compounds.

The following non-limiting examples, in which all parts are by weight unless the contrary is indicated, illustrate the present invention. In each, natural gas and air are employed to produce hot combustion gases. Feed rates of the liquid hydrocarbon feedstock and flow rates of the gas and air are such as to provide generally complete combustion of the fuel gas while maintaining a temperature of about 2600° F. to about 3300° F. in the combustion zone of the reactor. The reactor employed in these examples and the general method of introducing feed materials thereto is substantially that described by U.S. Patent 3,060,003 to David C. Williams, though it is apparent that the present invention is applicable to essentially any type of reactor. The carbon blacks are recovered from the smoke by standard means forming no part of this invention, such methods being fully described in the art.

The liquid hydrocarbon feedstock employed in the example is of the following approximate composition:

| | |
|---|---|
| API gravity | 5.0 |
| Pour point ° F. | 32 |
| Flash point ° F. | 188 |
| Saybolt viscosity, SSU at 210° F. | 43.7 |
| Asphaltenes, percent | 1.71 |
| Aromatics, percent | 73.09 |
| Conradson carbon residue, percent | 7.12 |
| Sulfur, percent | 1.09 |
| Ash, percent | 0.019 |
| Correlation index | 106.49 |
| Molecular weight (Calculated UOP method) | 275 |

EXAMPLE 1

320 s.c.f.h. of natural gas having a net heating value of about 1050 B.t.u. 1 ft.$^3$ and requiring about 10.8 ft.$^3$ of air/ ft.$^3$ of gas for stoichiometric combustion, are burned with 4800 s.c.f.h. of air in a reactor of the above-described type to produce hot combustion gases in a combustion zone having a temperature of 2800 °F. 4.72 gallons per hour of the above-described feedstock oil are injected axially into said reactor. The feedstock rapidly mixes with the combustion gases and is dissociated, predominantly within a dissociation zone downstream of said combustion zone, into carbon black and byproduct gases. In a quenching zone downstream of said dissociation zone, quench water is introduced by spraying through a nozzle into the hot products at the rate of 24 gallons per hour. The quenching fluid contains cobaltous formate, in a weight concentration of 3%. Approximately 17.5 pounds of product are recovered per hour. The carbon black product is ashed down and is found to have an iron content of about 8%. The particle size of the black is found to be in the normal range for carbon black particles. Substantially all of the particles in a given sample of product are attracted by a common horse-shoe magnet. No effect is noted when ordinary carbon black is subjected to the field of the magnet.

EXAMPLE 2

The procedure of Example 1 is repeated, using the metal-containing compounds and concentrations thereof indicated in the following table:

| Compound | Concentration [1] | Metal in Product, Percent |
| --- | --- | --- |
| Cobalt Acetate | 0.02 (2%) | 4.2 |
| Ferrous Sulfate | 0.024 (2.3%) | 3.9 |
| Nickel Formate | 0.08 (4%) | 23.5 |
| Nickel Nitrate | 0.08 (8%) | 18.5 |

[1] Where present weight of water of crystallization has been *omitted from* concentration calculations. The products are recovered at the rate of approximately 8.7 pounds per hour. They have a normal particle size for carbon black and are attracted by a common horseshoe magnet.

What is claimed is:

1. A method of producing metal-bearing carbon black, comprising the steps of: dissociating a hydrocarbon feedstock in a dissociation zone at a temperature of at least about 2300° F.; passing the resultant carbon black and effluent gases to a cooling zone; in said cooling zone, cooling said carbon black and effluent gases to a temperature below about 1500° F. by spraying water into said cooling zone; said water having dispersed therein a heat-decomposable metal-containing compound containing at least one element selected from the group consisting of iron, nickel, cobalt and mixtures thereof and which is present in sufficient concentration to provide in the resultant carbon black product a content of from about 0.5% to about 50% by weight, based on the entire product, of said iron, nickel, cobalt or mixture thereof.

2. A process in accordance with claim 1 wherein the temperature in said dissociation zone is at least about 2600° F.

3. A process in accordance with claim 1 wherein said metal-containing compound is water soluble.

4. A process for preparing magnetic carbon black, comprising steps of: dissociating a hydrocarbon feedstock in a dissociation zone at a temperature of at least about 2300° F.; passing the resultant carbon black and effluent gases to a cooling zone; in said cooling zone, cooling said carbon black and effluent gases to a temperature below about 1500° F. by spraying water into said cooling zone; said water having dispersed therein a heat-decomposable metal-containing compound which contains at least one element selected from the group consisting of iron, nickel and cobalt and which is present in sufficient concentration to provide in the resultant carbon black product a content of from about 5% to about 35% by weight, based on the weight of the entire product, of iron, nickel, cobalt or a mixture thereof.

5. A process in accordance with claim 4 wherein the temperature in said dissociation zone is maintained in the range of about 2600° F. to about 3300° F.

6. A process in accordance with claim 4 wherein the metal-containing compound is ferrous sulphate.

7. A process in accordance with claim 4 wherein the metal-containing compound is nickel nitrate.

8. A process in accordance with claim 4 wherein the metal-containing compound is cobaltous formate.

References Cited

UNITED STATES PATENTS

| 3,213,026 | 10/1965 | Jordan et al. | 106—307 |
| 3,306,761 | 2/1967 | Johnson | 106—307 |

TOBIAS E. LEVOW, *Primary Examiner.*

R. D. EDMONDS, *Assistant Examiner.*

U.S. Cl. X.R.

106—307; 23—209.4